Oct. 13, 1970  F. M. BROWN ET AL  3,533,128

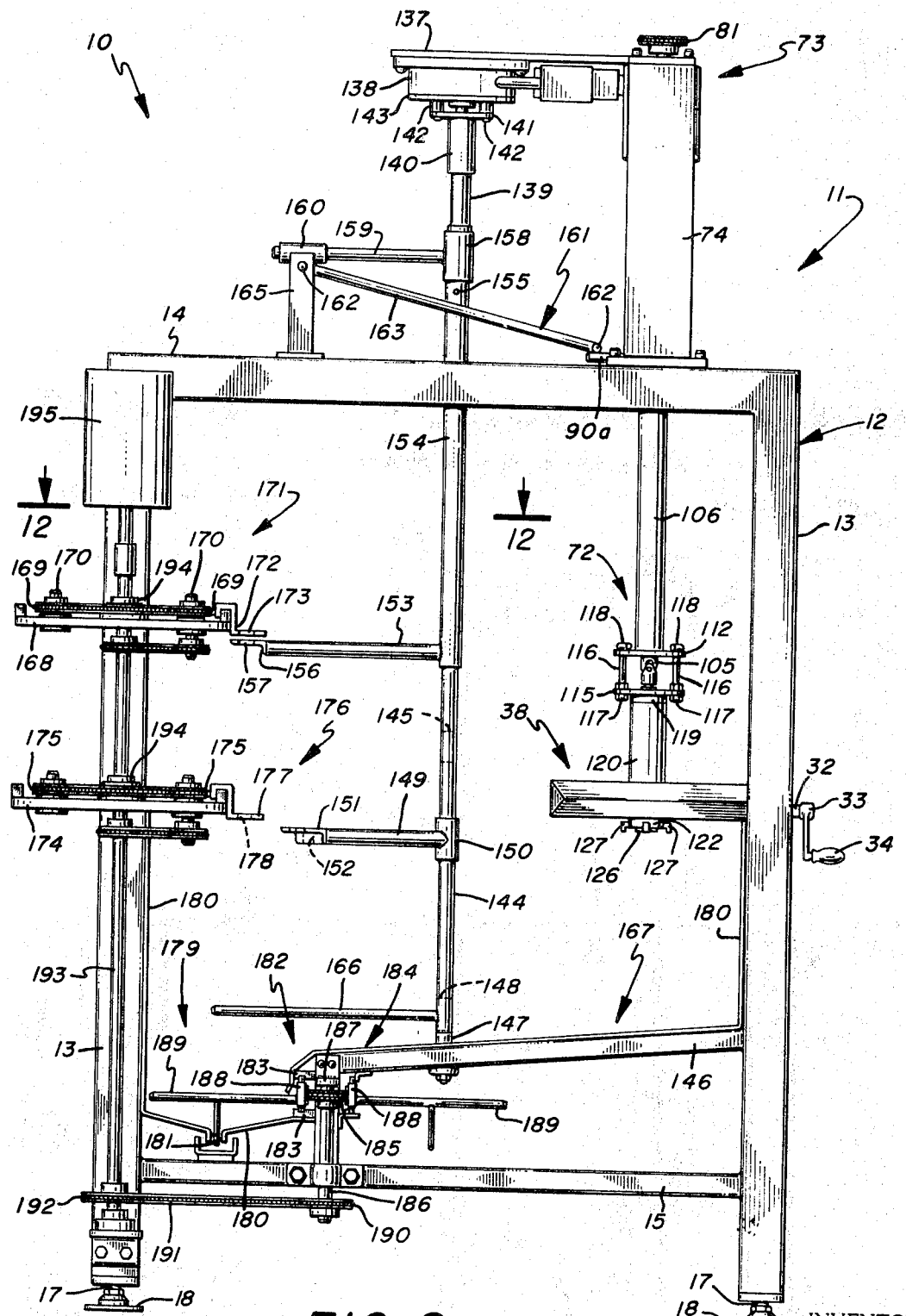

APPARATUS FOR DEBONING MEAT

Filed Jan. 22, 1968  10 Sheets-Sheet 1

INVENTORS
GERALD L. HELGESON
JESSE A. WILLCOX
FRANK M. BROWN
JEAN A. BURTON

BY *Williamson, Palmatier & Bains*

ATTORNEYS

INVENTORS
GERALD L. HELGESON,
JESSE A. WILLCOX,
FRANK M. BROWN,
JEAN A. BURTON

BY *Williamson, Palmatier & Bains*   ATTORNEYS

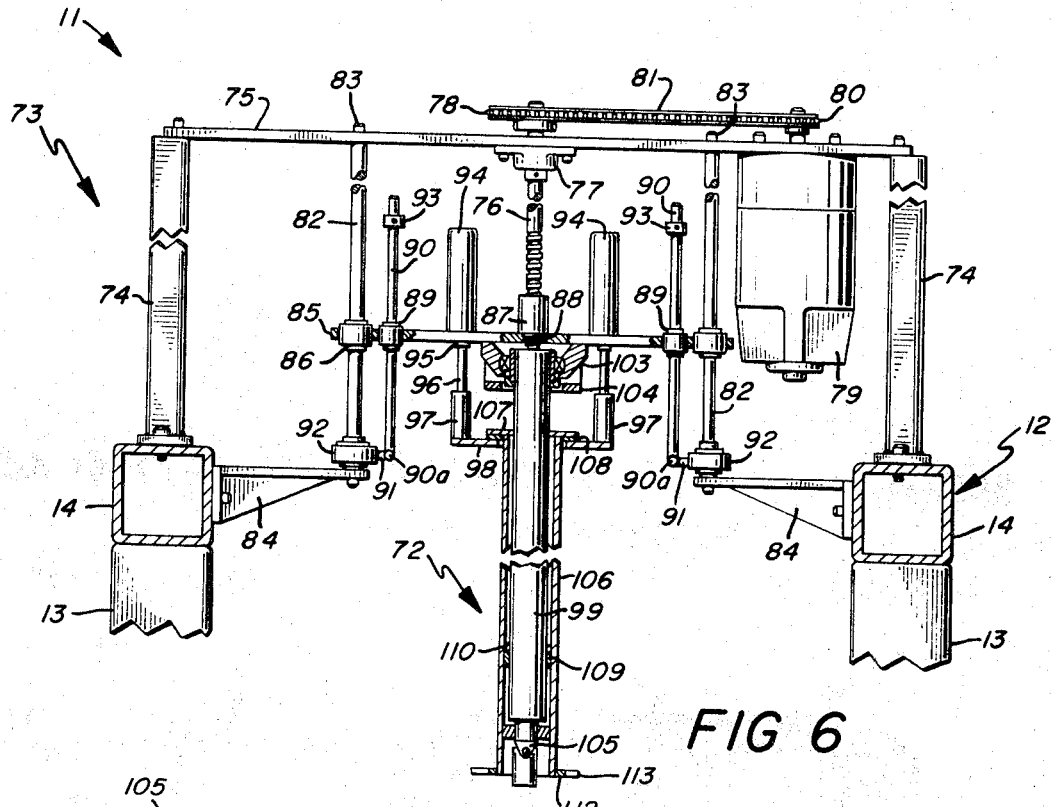
FIG 6
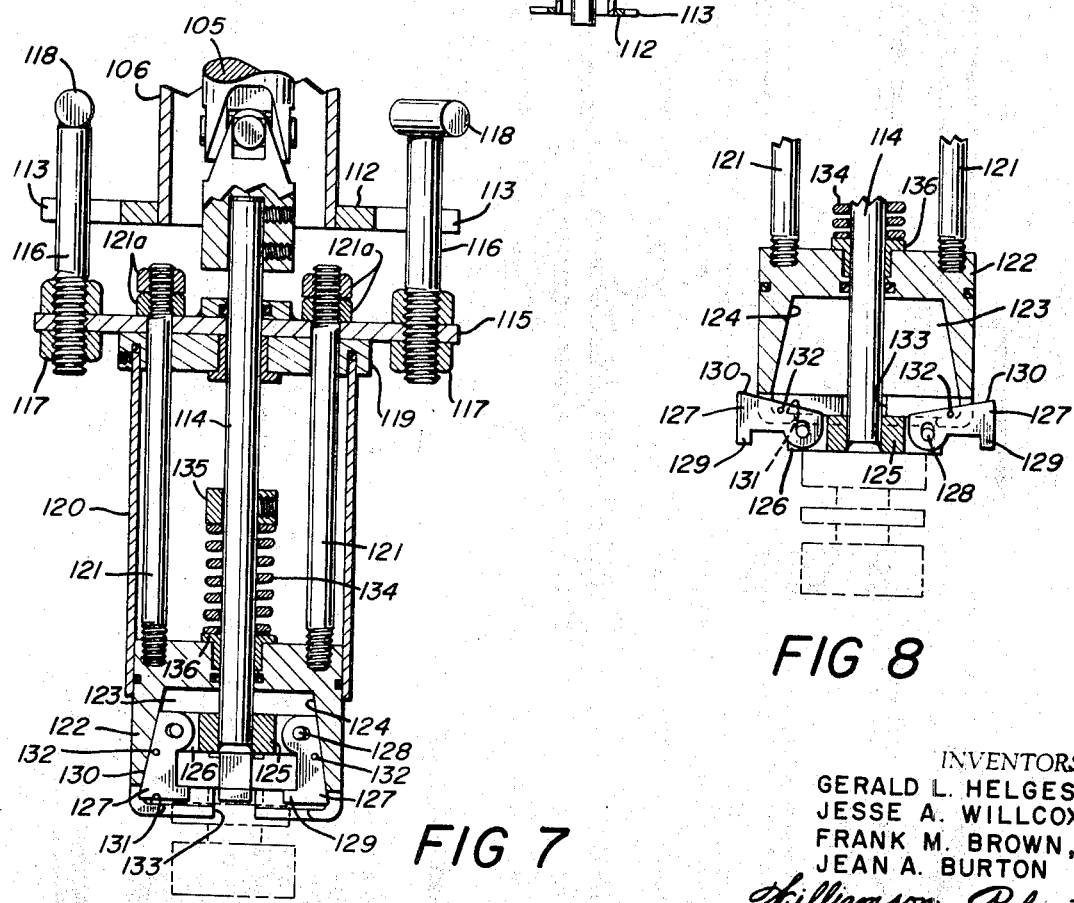
FIG 7
FIG 8

Oct. 13, 1970     F. M. BROWN ET AL     3,533,128
APPARATUS FOR DEBONING MEAT

Filed Jan. 22, 1968     10 Sheets-Sheet 6

INVENTORS
GERALD L. HELGESON,
JESSE A. WILLCOX,
FRANK M. BROWN,
JEAN A. BURTON

BY Williamson, Palmatier & Bains
ATTORNEYS

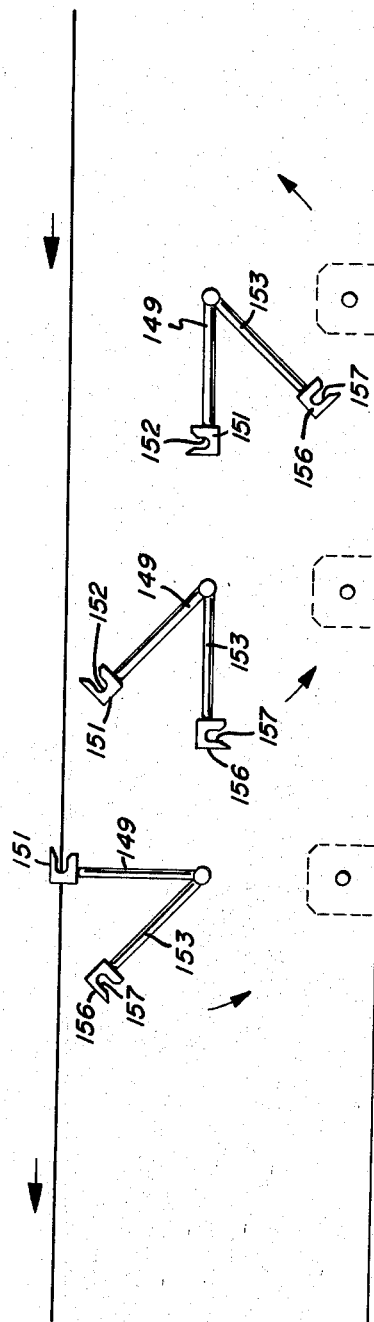

FIG 15

| POSITION | 1 | 2 | 3 |
|---|---|---|---|
| OPERATION | TAKE PICNIC OFF CONVEYOR | TRANSFER PICNIC | WAIT FOR END OF BONING CYCLE |
| AUTO. CLOSE POSITION SWITCH: | 1 | 2 | 3 |
| | FULL PICNIC TROLLEY PASSES, LEAVES PICNIC, TRIPS SWITCH "B". TABLE INDEXES TO POSITION 2. | TABLE INDEXES TO POSITION 3. | COMPLETION OF CUT TRIPS "C". U-JOINT LOCKS & DISENGAGES, HI-PRESSURE WATER SHUTS OFF, IRIS OPENS, SPINDLE RUNS AT HIGH SPEED UNTIL "D" CLOSES, TABLE INDEXES TO POSITION 4. |
| SPINDLE | SLOW SPEED UP | SLOW SPEED UP | SLOW SPEED UP—THEN HIGH SPEED UP UNTIL "D" HIT & TIME DELAY ELAPSES |

United States Patent Office 3,533,128
Patented Oct. 13, 1970

3,533,128
APPARATUS FOR DEBONING MEAT
Frank M. Brown, Jean A. Burton, and Gerald L. Helgeson, Austin, and Jesse A. Willcox, Excelsior, Minn., assignors to Geo. A. Hormel & Company, Austin, Minn., a corporation of Delaware
Continuation-in-part of applications Ser. No. 493,362, Oct. 6, 1965, and Ser. No. 607,572, Jan. 5, 1967. This application Jan. 22, 1968, Ser. No. 699,519
Int. Cl. A22c 17/04
U.S. Cl. 17—1                       9 Claims

ABSTRACT OF THE DISCLOSURE

A process and apparatus for removing a bone or core member from embedded relation within a chunk of meat, or other material wherein the chunk of meat is properly positioned by infeed mechanism against a barrier having an adjustable opening therein through which the bone or core member projects. A revolvable spindle assembly engaging the bone and pulling the same through the opening while subjecting the periphery of the bone to the action of high velocity jets of water to cause progressive separation of the bone from the chunk of meat while maintaining the chunk of meat and bone in substantially intact condition. A removal mechanism for removing the extracted bone from the spindle assembly.

---

This invention relates to a process and apparatus for removing a core member of an article from embedded relation within a second material of the article. More specifically, to a process and apparatus utilizing a fluid pressure for separating bone from embedded relation within a chunk of meat. This is a continuation-in-part of our co-pending applications Ser. No. 493,362, filed Oct. 6, 1965, now abandoned, and Ser. No. 607,572, filed Jan. 5, 1967, now Pat. No. 3,402,423.

An object of this invention is to provide process and apparatus for removing bone from embedded relation within a chunk of meat, in which the chunk of meat is positioned adjacent a barrier by infeed means, with the bone being caused to be moved through an opening in the barrier while subjecting the bone to the action of high velocity jets of flowable material, preferably water, to separate the bone in substantially intact condition from the chunk of meat, which is also maintained in substantially intact condition, with provision for removal of the meat and bone as the separation is completed.

A more specific object of this invention is to provide process and apparatus for removing bone from embedded relation with a chunk of meat, in which a plurality of deboning units are arranged in proximal relation with each other with provision of suitable conveyor means for conveying chunks of meat being engaged by suitable indexing infeed means associated with each deboning unit, which positions the chunks of meat in the deboning unit where separation of the meat and bone takes place, with suitable removal means being provided for removing the extracted bones from the deboning unit and positioning the bones for engagement by suitable conveyor means, and with provision of suitable conveyor means for removing the deboned chunks of meat, the entire operation being capable of continuous uninterrupted operation and there being little, if any, loss of meat during the separation process.

A more specific object of this invention is to provide process and apparatus of the class described, in which the barriers for each deboning unit comprises a plurality of similar barrier segments disposed in overlapping relation with respect to each other and defining an opening at their respective inner ends through which the embedded bone of the chunk of meat is moved, these barrier segments being arranged and constructed to define nozzle mechanisms at their inner end through which jets of water are dispensed, so that very accurate and effective application of the high velocity jets of water is applied to the bone for separating the meat therefrom.

Another object of this invention is to provide process and apparatus for removing bone from embedded relation within a chunk of meat, wherein the infeed means for introducing the chunks of meat to be deboned into the deboning units, and the bone removal means for removing the extracted bone therefrom, are arranged and constucted for simultaneous indexing action to permit efficient cooperation with suitable conveyor means for the transfer of chunks of meat to the deboning machine and continuous removal of the extracted bones therefrom.

These and other objects and advantages of this invention will more fully appear from the following description made in connection with the accompanying drawings wherein like reference characters refer to the same or similar parts throughout the several views, and in which:

FIG. 2 is a side elevational view of a deboning unit;

FIG. 6 is a fragmentary elevational view of the upper portion of one of the deboning units illustrating the spindle assembly with certain parts thereof broken away for clarity;

FIG. 7 is a vertical sectional view of the lower end portion of a spindle assembly on an enlarged scale illustrating details of construction thereof with the gripping means illustrated in closed condition;

FIG. 8 is a side view of the gripping means at the lower end of the spindle assembly, partly in section and partly in elevation and illustrated in the open condition;

FIGS. 15 and 15a are a diagrammatic illustration of the meat loading and bone removal means illustrating the same in a plurality of positions of a complete cycle.

Figure 1:
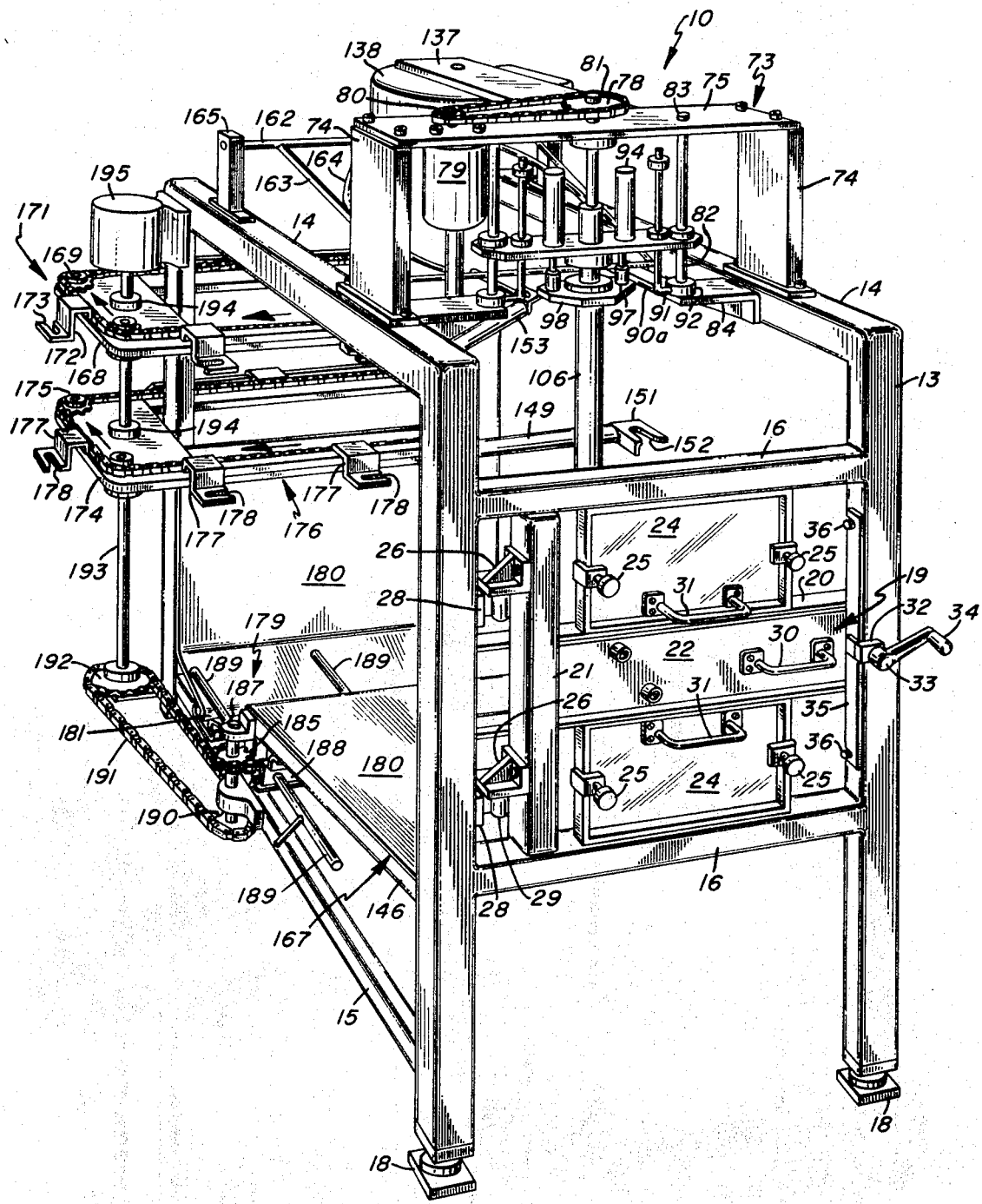
FIG. 1 is a perspective view of the apparatus illustrating a single unit in full line configuration.

Although the present process and apparatus is especially adapted for removing or extracting an embedded bone in a chunk of meat through the action of high velocity jets of flowable material, preferably, water, it is also contemplated that the present process and apparatus may be used to separate other core members from embedded relation within a second material of an article.

One of the essential features of the present invention is that during the separation process, the high velocity jets of flowable material, such as water, separate the core member from embedded relation within a second material, while maintaining the integrity of the core member and other material.

More specifically, when the present process and apparatus is used in a bone removing operation, the chunk of meat having a bone embedded therein is positioned adjacent and preferably against a barrier or iris assembly, which has an opening therein through which the embedded bone is moved. The means for moving the bone comprises a spindle assembly which releasably engages a pinning fixture affixed to the end of the bone and which progressively pulls the bone through the opening therein.

The barrier is comprised of segments capable of yielding movement, thus accommodating bones of varying cross-sectional size. End portions of the barrier assembly have suitable nozzle mechanisms mounted thereon which discharge water angularly against the bone as it is pulled through the opening in the barrier assembly, while the chunk of meat is held against the barrier assembly. By revolving the spindle, the periphery of the bone is subjected to the action of high velocity jets of water, thus causing the flesh to be peeled or cut away from the bone with a minimum loss of flesh particles. The iris or barrier assembly is used to retain the chunk of meat thereagainst while the bone is pulled through, and is also used to provide accurate positioning of the nozzle mechanisms so that highly effective and accurate application of the high velocity jets of water is obtained.

The present process and apparatus is also directed to unique infeed means which removes the chunk of meat to be deboned from conveyor means and which transfers the chunk of meat into position for engagement by the spindle assembly gripping means. Means are also provided for removing bone extracted from the chunk of meat and for transferring these bones to another conveyor means with provision being made for removal of the deboned chunk of meat to a suitable collection station or the like. This unique infeed and bone removal means all cooperate with suitable conveyor means to permit the deboning operation to be continuously carried out.

The present invention also contemplates apparatus and process which utilize a plurality of deboning units arranged in juxtaposed relation with each other and each being capable of independent operation, thus permitting a high capacity continuous operation to be obtained. In the present apparatus, a plurality of deboning units are arranged in an in-line fashion, although other arrangements may be employed.

Referring now to the drawings and more specifically to FIG. 1, it will be seen that one embodiment of the novel apparatus for carrying out the novel process, and designated generally by the reference numeral 10 is thereshown. The apparatus, includes a plurality of deboning units 10 which, as shown, are disposed in line with respect to each other and are capable of independent operation with respect to each other. Each deboning unit 11 includes a frame structure 12 comprised of a pair of U-shaped frame members each comprised of a vertical frame element 13, each being connected at its upper end by an upper horizontal side frame element 14. Each pair of vertical frame elements of each U-shaped member are interconnected adjacent their lower-most end by lower horizontal side frame elements 15.

Adjacent vertical frame elements 13 of each U-shaped member are also interconnected by spaced apart horizontal transverse frame elements 16, as best seen in FIGS. 1, 2, 3, and 9. Thus, it will be seen that the frame structure 12 is of generally rectangular configuration. The lower ends of the vertical frame elements 13 have threaded rods 17 threadedly engaging the same and these threaded rods each have a leveling pad 18 affixed thereto in a well-known manner. This arrangement permits the frame structure to be leveled with respect to the surface on which it is positioned.

Figure 10:
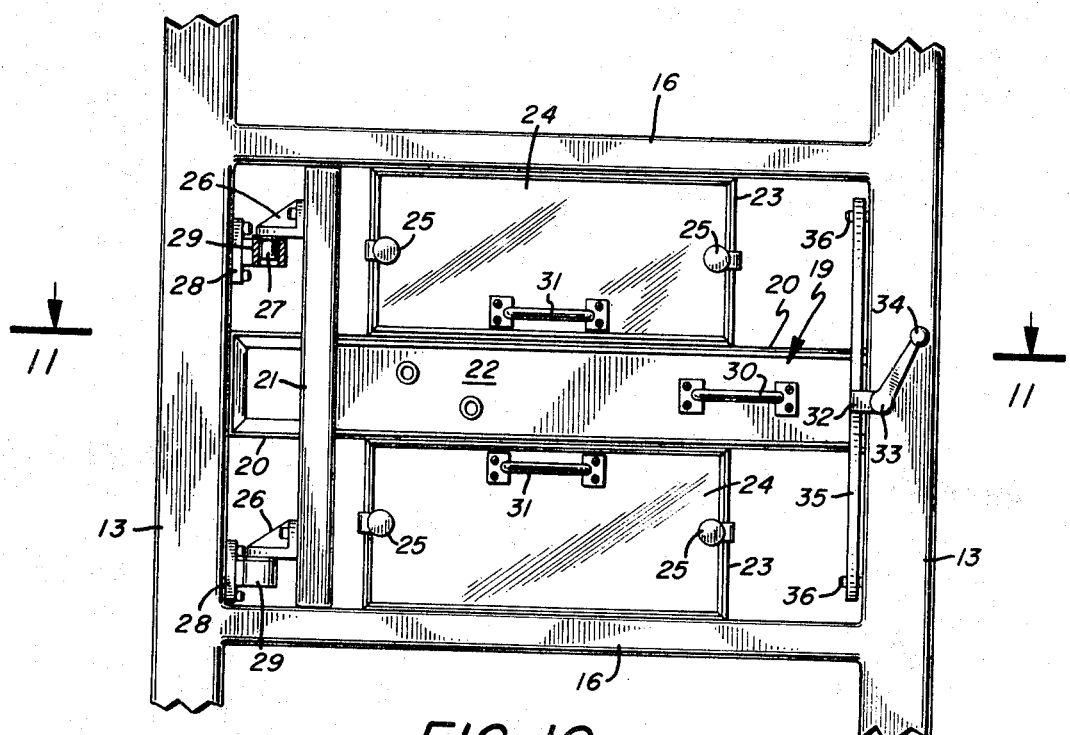
FIG. 10 is a fragmentary side elevational view of a deboning unit illustrating details of construction of the cabinet thereof.
Figure 11:
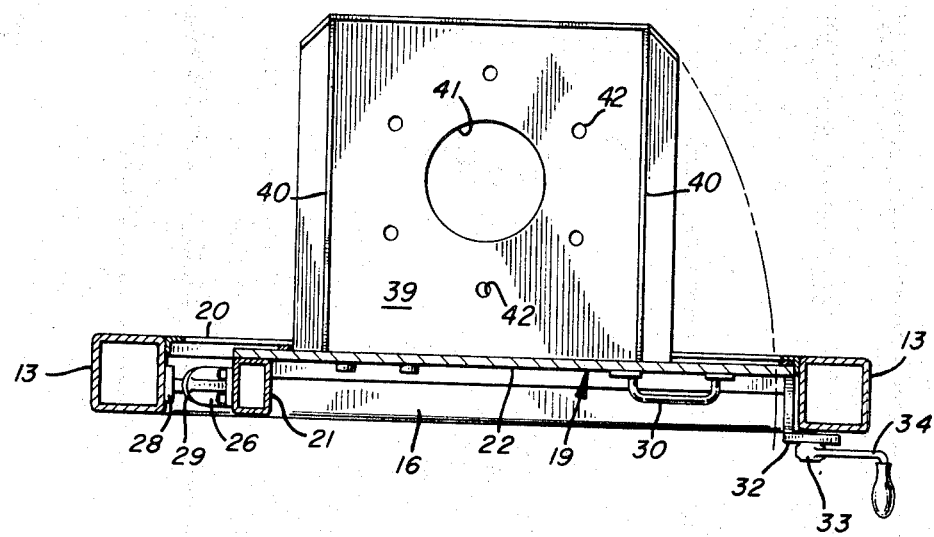
FIG. 11 is a cross-sectional view taken approximately along line 11—11 of FIG. 9 and looking in the direction of the arrows.
Figure 12:
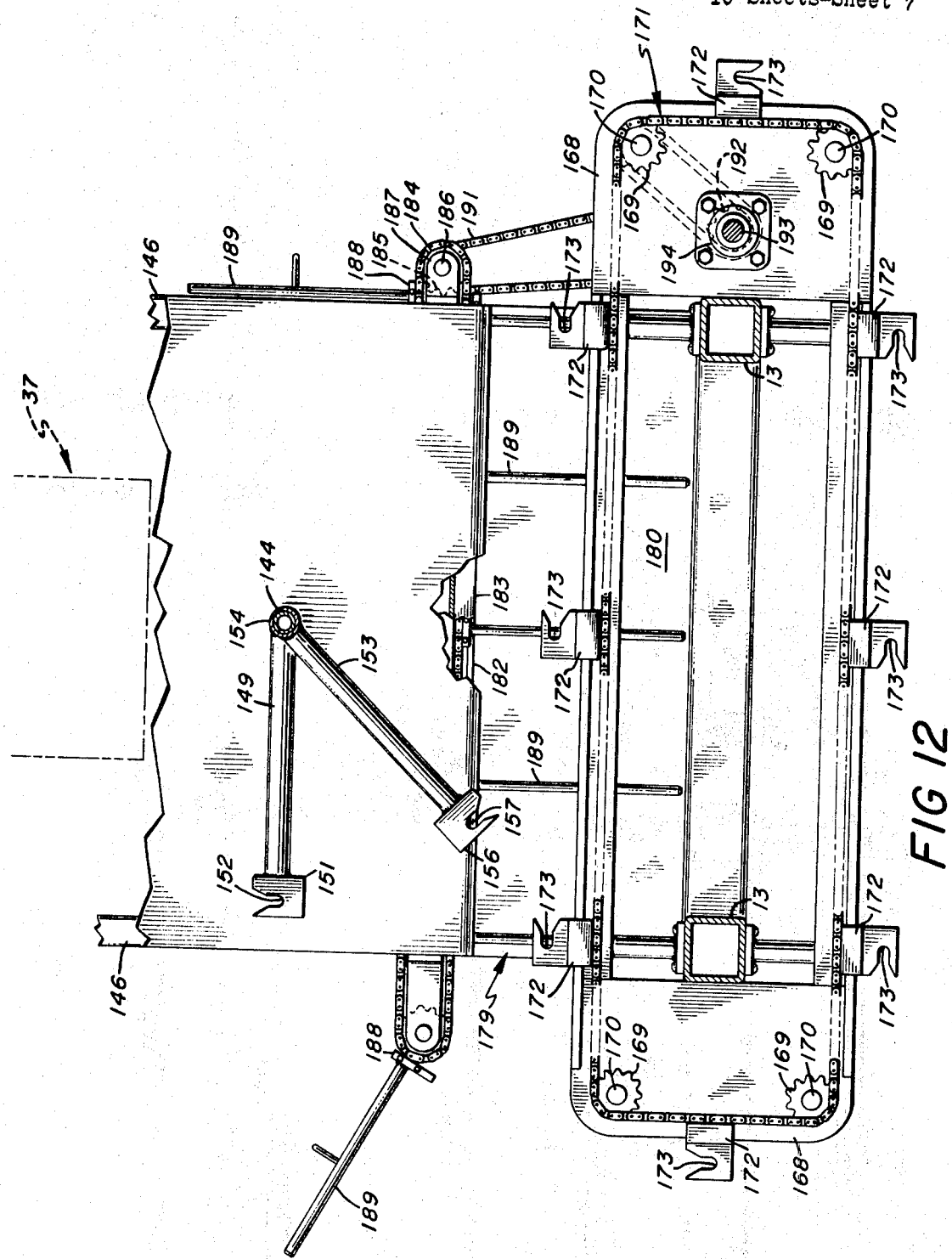
FIG. 12 is a cross-sectional view taken approximately along line 12—12 of FIG. 2 and looking in the direction of the arrows.

Referring now to FIGS. 1, 10, and 11, it will be seen that a door structure 19 is swingably mounted between a pair of the vertical frame elements 13 and a pair of the transverse frame elements 16. A vertically oriented rectangular open door frame 20 is positioned midway between two transverse frame elements 16 and extends between and is secured to the vertical frame elements 13. The door structure includes a central horizontal plate 22 positioned adjacent the horizontal door frame 20 when the door structure is in the closed position, The plate 22 is rigidly secured to the vertical door element 21.

The vertical door frame element 21 has a pair of vertically spaced apart brackets 26 secured thereto, each having a male hinge element 27 which depends therefrom. One of the vertical frame elements 13 has a pair of brackets 28 secured thereto, which are vertically spaced apart and each having a female or socket hinge element 29 secured thereto for receiving one of the male hinge elements 27 therein. This arrangement permits the door structure to be swung between opened and closed position. The door structure 19 when swung to an open position may be lifted out of engaging relation with the female hinge elements. Since the iris assembly is secured to plate 22, the iris assembly can be readily replaced by removing the door structure from the female hinge elements. A handle 30 is secured to the plate 22 to facilitate opening of the door and a pair of handles 31 are each secured to one of the observation windows 24 to facilitate removal and replacement thereof.

A bracket 32 is secured to an elongated vertical positioning plate 35 which in turn is secured to one end of the plate 22. A revolvable locking mechanism is mounted on the bracket 32 and is releasably engageable with the adjacent vertical frame element 13 when the door structure is in a closed condition to lock the door in this closed condition. This locking mechanism may be shifted into release or locked condition by revolving the handle 34 thereof. The vertically disposed plate 35 has notches or recesses therein which are engageable with pins 36 affixed to the adjacent frame element 13 to facilitate properly locating the door in the closed condition.

A pair of generally rectangular shaped metallic window frames 23 are each fixedly connected to one of the frame elements 16. Each window frame accommodates and releasably mounts a transparent observation window 24 by means of a releasable attachment element 25 as best seen in FIG. 11.

Figure 9:
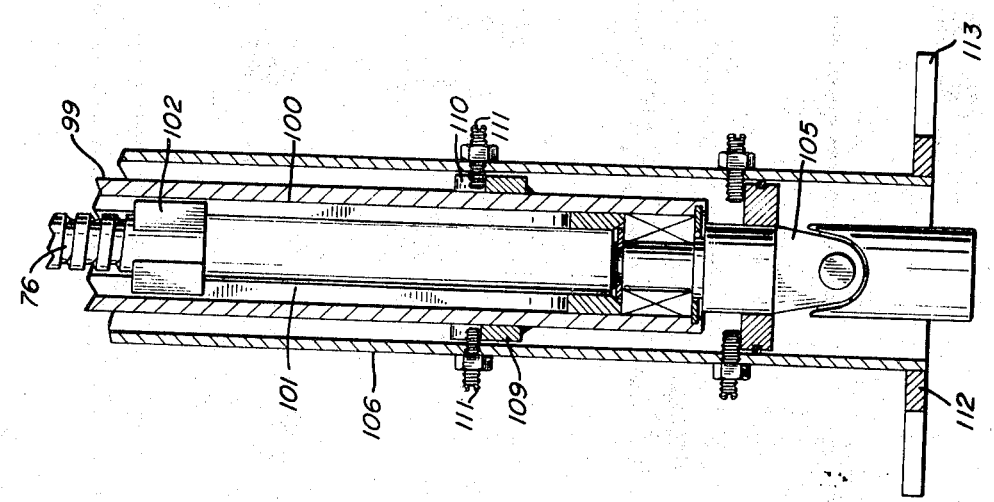
FIG. 9 is a fragmentary cross-sectional view of a portion of the spindle assembly illustrating details of construction thereof.
Figure 5:
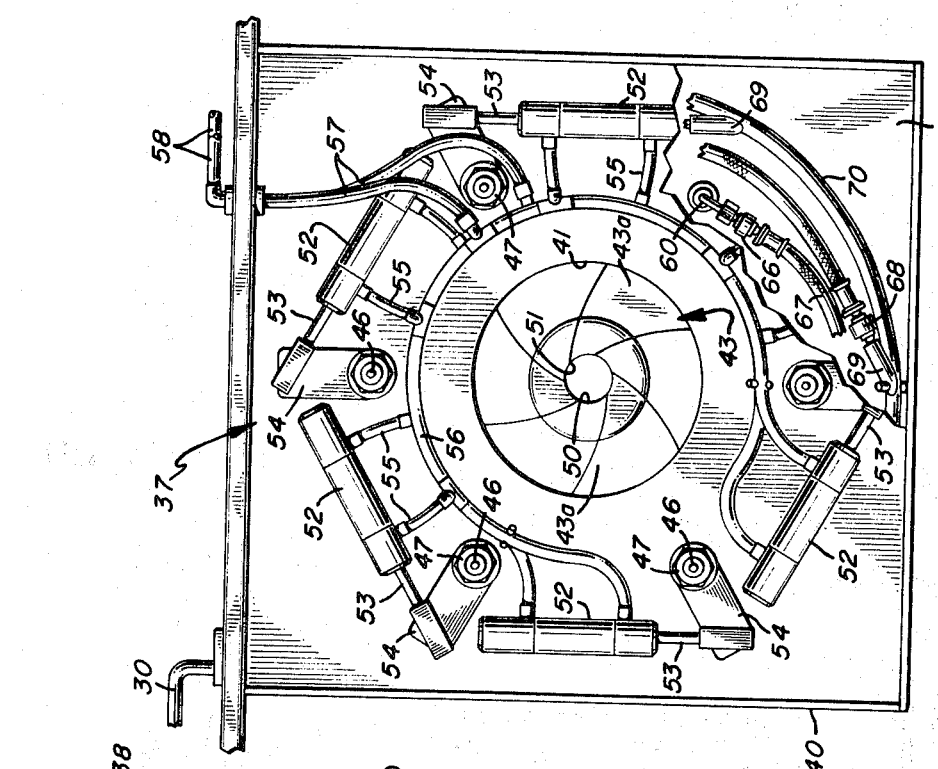
FIG. 5 is a partial top plan view of a barrier or iris assembly with parts thereof broken away for clarity and illustrating the pneumatic conduit and only certain high pressure water conduits.
Figure 4:
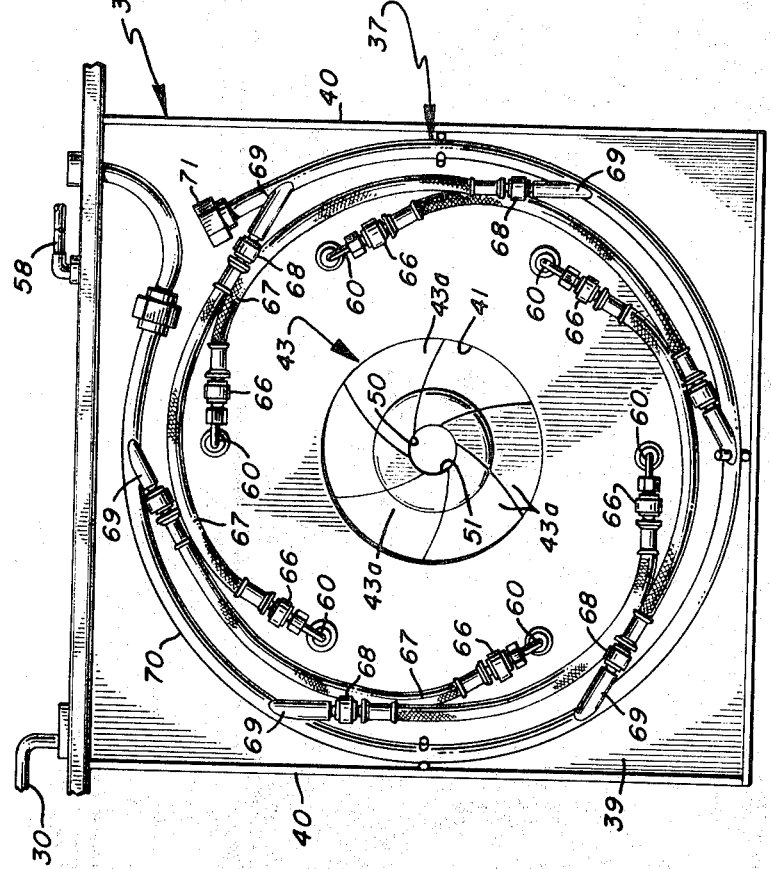
FIG. 4 is a top view of a barrier or iris assembly of one of the deboning units illustrating the high pressure water conduits but with the pneumatic conduits removed

It is pointed out that the door must be very accurately located in a predetermined position when in the closed condition, since the barrier or iris assembly designated generally by the reference numeral 37 is mounted thereon as best seen in FIGS. 4, 5, and 9. The barrier comprises a mounting structure 38, which is comprised of a substantially flat rectangular plate 39 having annular flanges 40 secured to three edges thereof, and having its fourth edge affixed to the central horizontal plate 22 of the door structure as by welding or the like. This mounting plate 39 is horizontally oriented and has a central opening 41 therein. The mounting plate also has a plurality of smaller openings 42 therein which are spaced outwardly from the large opening 41 and which are arranged in a substantially circular pattern, as best seen in FIG. 11.

Figure 13:
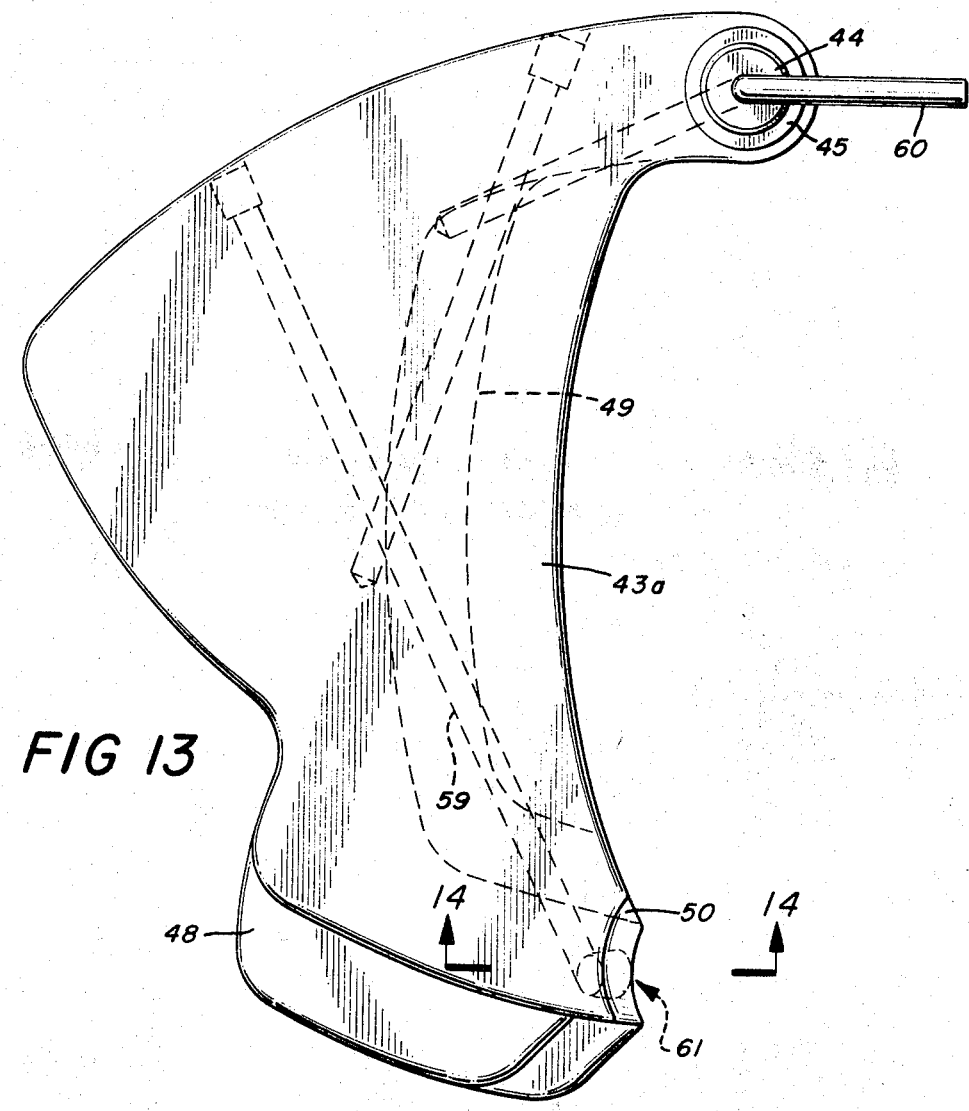
FIG. 13 is a plan view of one of the barrier or iris segments illustrating details of construction thereof.

Referring now to FIGS. 4, 5, and 13, it will be seen that the barrier assembly is comprised of a plurality of similar barrier segments 43 of substantially flat configuration and formed of a rigid metallic material, each having an attachment arm 44 integrally formed therewith and projecting laterally from one longitudinal edge thereof. The attachment arm 44, on each segment 43, has an upwardly projecting generally cylindrically shaped boss 45 integrally formed therewith and which projects through one of the openings 42 in the mounting plate 39. Each boss 45 has a threaded reduced portion 46 which is threadedly engaged by suitable jam nut 47 to pivotally mount the barrier segments 43 on the mounting plate 39. To this end, it will be noted that the barrier segments are positioned adjacent the lower surface of the mounting plate and are pivotal relative thereto about an axis defined by the boss of each segment.

It will be seen that each segment 43, while being of generally flat configuration, has one peripheral edge portion thereof, which is relieved to define an upwardly facing recess 48 and also having another relieved peripheral portion thereof to define a downwardly facing elongate recess 49. It will be noted that the peripheral portion 49 of one segment overlies and cooperates with a peripheral recess portion 48 of the next adjacent segment. It will also be noted, that an inner peripheral edge portion of each iris segment is of arcuate concave configuration as at 50 so that the iris segments define a generally circular opening 51 therethrough which is substantially smaller than the opening 41 in the plate 39. This opening 51 is of a size to snugly accommodate the periphery of the bone or other core member during the separation operation.

Means are also provided for yieldably resisting movement of the iris or barrier segments and for permitting ready adjustment of the segments to vary the size of the opening 51. This means includes a plurality of double-acting pneumatic cylinders 52, each associated with one barrier or iris segment and each being pivotally mounted on the upper surface of the mounting plate 39 by a suitable pivot pin to permit pivoting of each cylinder about a vertical axis. Each cylinder has a piston movable therein to which is connected a piston rod 53, which in turn is pivotally connected to one end of an arm 54, which in turn is provided with a suitable aperture and is secured to the boss 45 of one of the segments 43. The extension and retraction of the piston rod 53 causes swinging movement of the iris segments to allow adjustment of the opening 51 of the iris assembly. The pneumatic cylinders also act as air cushions or springs to permit the iris segments to yield in response to the bone as it passes through the opening in the iris assembly.

Each cylinder 52 is connected by branch conduits 55 to a manifold conduit 56, which in turn is connected by conduits 57 to a main supply conduit 58, as best seen in FIG. 5. This main supply conduit 58 is connected to a source of pneumatic pressure with provision for suitable valve means so that an operator may readily adjust the size of the opening 51 through the barrier assembly to permit high speed operation of the spindle assembly which will be described hereinbelow. It is also pointed out that the use of pneumatic cylinder and piston units for each iris segment provides a cushioning effect to pivotal movement of each segment to assure that the segments will accommodate irregularities in a bone or other core member while snugly engaging such a bone or core member.

Figure 14:
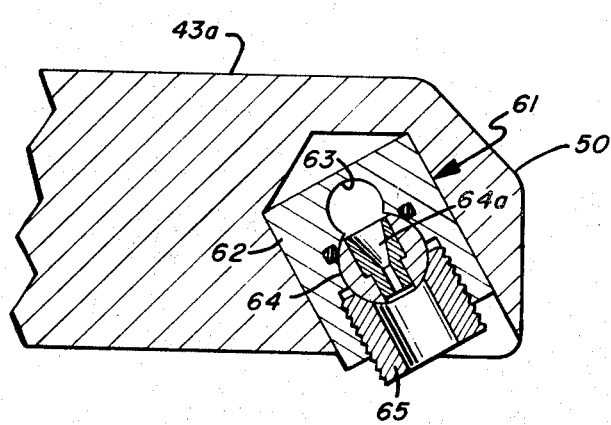
FIG. 14 is a cross-sectional view taken approximately along line 14—14 of FIG. 13 and looking in the direction of the arrows.

Referring again to FIGS. 13 and 14, it will be seen that each iris or barrier segment has associated therewith, a jet mechanism through which a high pressure jet of water is discharged. Each barrier segment has an elongate passage 59 therein which extends from and communicates with the opening through the boss 45 to a point located closely adjacent the arcuate concave edge portion 50 of the associated segment. The passage 59 communicates with one end of an elongate conduit 60. The passage 59 communicates with the body 62 of a nozzle mechanism 61. The body 62 has a bore 63 therethrough which communicates with the passage or orifice of an orifice assembly 64. A sleeve type fitting 65, which is externally threaded, threadedly engages internal threads in the nozzle body 62 and retains the orifice assembly 64 within the body 62. It will be noted that the passage through the orifice assembly and sleeve fitting 65 defines a venturi passage 64a to substantially increase the velocity of the water as it is discharged therefrom. It will be noted that the nozzle mechanism 61 is directed downwardly and angularly.

Referring now to FIG. 4, it will be seen that each conduit 60 is connected by suitable fitting assembly 66 to a flexible conduit 67. Each flexible conduit 67 is, in turn, connected by a fitting assembly 68 to a manifold branch conduit 69, which is interconnected to a manifold conduit 70. One end of the manifold conduit 70 is closed in sealing relation by suitable plug device 71, while the other end of the manifold conduit is connected to a source of water under pressure. It will be appreciated that pump means will be provided to develop the pressures and velocities needed to effectively separate the meat from the bone.

Referring now to FIGS. 6, 7 and 8, it will be seen that a novel spindle assembly 72 is provided, which exerts an axial force on the bone as it is being extracted from the chunk of meat. The spindle assembly 72 is suspended from a generally U-shaped mounting structure 73, which is affixed to the upper horizontal side frame elements 14 and which projects upwardly therefrom. The mounting structure 73 includes a pair of rectangular members 74 having flanges at their lower ends which are rigidly affixed to the upper horizontal side frame elements 14 of the frame structure 12. The mounting structure 73 also includes a web portion or plate 75 which extends between and is rigidly connected to the upper ends of the members 74.

The spindle assembly 72 includes an elongate shaft 76 which projects through an aperture in the web plate 75 and which is journalled in the bearing 77 affixed to the lower surface of the web plate 75. The upper end of the shaft 76 has a large sprocket 78 keyed thereto for rotation therewith. It will be noted that the sprocket 78 is positioned above the upper surface of the web plate 75. An electric motor 79 is affixed to the lower surface of the web plate 75 and is spaced from the shaft 76. The output shaft of the electric motor 79 has a sprocket 80 keyed thereto for rotation therewith. It will be noted that the sprocket 80 is substantially smaller than the sprocket 78. An endless drive chain is trained about sprockets 78 and 80 to impart drive to the shaft 76.

The upper end of each of a pair of elongate guide rods 82 are positioned against the lower surface of the web plate 75 and are secured thereto by suitable bolts as best seen in FIG. 6. The lower ends of these guide rods are rigidly secured to the upper surface of a pair of L-shaped brackets 84, which are secured to the upper horizontal side frame elements 14 of the frame structure 12. It will be noted that the guide rods are positioned on opposite sides of the shaft 76 and are spaced therefrom. The substantially flat rectangular horizontally oriented plate 85 is provided with apertures therein adjacent the marginal portions thereof, which accommodate suitable bearings 86, which are positioned around the guide rods 82 to permit the plate 85 to be vertically translated relative thereto and guided by the guide rods 82.

The shaft 76 is externally threaded and threadedly engages the internal threads of a nut 87, which is disposed intermediate the ends of the shaft 76 and which has an externally threaded reduced end portion 88 which threadedly engages a threaded aperture in the plate 85. With this arrangement, the plate 85 will be shifted vertically relative to the shaft 76 during revolving movement of the latter.

The plate 85 also has a pair of apertures therein, in which is positioned a pair of bearings 89, each having an elongate rod 90 projecting therethrough. The lower end of each rod 90 has a terminal portion 91, which is offset at substantially 90° relative thereto. This offset terminal portion 91 of each rod 90 projects into an aperture in a bushing 92, which is positioned around the lower end of one of the rods 82. The upper end of each rod 90 has a collar 93 secured thereto by a suitable set screw to permit the collar to be adjustably positioned axially of the rod 90.

A pair of similar vertically oriented elongate pneumatic cylinders 94, having externally threaded reduced lower ends 95, threadedly engage threaded apertures in the plate 85. These pneumatic cylinders have pistons movable therein, which are secured to piston rods 96 that project exteriorly downwardly therefrom. Each piston rod 96 has its lower end secured in one of a pair of sleeves 97, which are affixed to a small plate 98 disposed below the plate 85.

An elongate drive tube assembly is positioned concentrically around the shaft 76 and comprises an outer tube 99, in which is positioned an inner tube 100, the latter being slightly shorter than the outer tube. These tubes 99 and 100 revolve as a unit, and to this end, it will be noted that the inner tube 100 is split substantially throughout its length to define a pair of diametrically opposed axially extending slots 101. The lower end portion of the shaft 76 has a key or spline element 102 affixed thereto and positioned in the slots 101 so that angular or revolving drive from the shaft 76 is transmitted to the drive tube assembly.

The upper end of the drive tube assembly is revolvable in a bearing assembly 103 secured to the lower surface of the plate 85 and projecting downwardly therefrom. The bearing assembly is provided with a friction brake 104, the function of which will be described more fully hereinbelow.

The lower end of the drive tube assembly has a universal joint coupling 105 secured thereto for rotation therewith.

Referring again to FIG. 6, it will be noted that the drive tube assembly also includes a generally elongate external tube 106 of substantially circular cross-sectional configuration which is positioned around and spaced from the outer tube 99 of the drive tube assembly. This external tube has an annular flange 107 integrally formed with the upper end thereof and extending radially outwardly therefrom. The external tube 106 extends through an aperture in the plate 98 so that the radial flange 107 overlies the plate. The bearing 108 is positioned between the flange 107 and the plate 98 to permit the external tube to rotate relative to the plate 98.

Means are provided for permitting the external tube 106 to be selectively driven with the drive tube assembly for permitting disengagement of the external tube from driven relation with the drive tube assembly. This means includes an annular clutch element 109 having a plurality of downwardly extending notches therein to define a plurality of spaced apart upwardly opening teeth 110, as best seen in FIG. 9. This clutch element 109 is rigidly affixed to the outer surface of the outer tube 99 and is disposed concentrically therewith. The external tube 106 has a pair of clutch engaging elements 111 secured thereto and projecting radially inwardly therefrom. These clutch engaging elements are externally threaded and project into the recess between adjacent teeth 110 of the clutch element 109. With this arrangement, when the drive tube assembly is revolved, the drive is transmitted through the clutch element 109 and clutch engaging elements 111 to the external tube 106. However, when relative vertical shifting movement is effected between the other components of the drive tube assembly and the external tube 106, the clutch engaging elements 111 will be shifted out of engaging relation with the clutch engaging teeth of the clutch engaging element, thus permitting relative rotation between the external tube and the remaining components of drive tube assembly.

The lower end of the external tube 106 has an outturned radial flange 112 vertically formed therewith, which is provided with a plurality of outwardly opening slots 113 in the periphery thereof. The lower socket element of the universal joint coupling 105 has an upper end of an elongate shaft 114 secured therein by suitable set screws and the like. The shaft 114 projects through an opening in a plate 115 and is revolvable relative thereto. The plate 115 also has apertures in the peripheral portion thereof, through which the shanks of T-shaped bolts 116 project. Suitable nuts 117 threadedly engage a threaded portion of each T-shaped bolt 116 to fixedly secure the same to the plate 115. The shanks of these T-shaped bolts also project through the slots 113 in the flange 112, and the cross-head 118 of each T-shaped bolt is adapted to engage the radial flange 112 upon relative shifting movement of the external tube with respect to the drive tube assembly.

An annular plate 119 is secured against the lower surface of the plate 115, and this annular plate 119 has a downwardly facing annular flange therein, in which is positioned and upper peripheral edge of an elongate tube 120. The tube 120 is secured against disengagement from the annular plate 119 by suitable set screw means, as best seen in FIG. 7. Plates 115 and 119 have registering openings therein, through which project elongate rods 121, each having opposite ends thereof threaded. The upper ends of the rods 121 project through and beyond the plate 115 and are engaged by suitable nuts 121a. The lower threaded ends of each rod 121 threadedly engage in threaded recesses of an entirely cylindrical downwardly opening chuck housing 122. The chuck housing, as best seen in FIGS. 7 and 8, has a downwardly opening hollow interior 123, which is of frusto-conical configuration so that the interior of surface 124 thereof defines a cam surface.

The lower end of the shaft 114 has a jaw mounting member 125 secured thereto and projecting generally radially outwardly therefrom. The jaw mounting member is of substantially flat circular configuration and has a plurality of outwardly opening radial notches 126 therein. In the embodiment shown, four such notches are provided and each accommodates therein, one of a plurality of jaws 127. Each jaw is pivotally mounted to the jaw mounting member by a pivot 128, and each jaw has an inwardly projecting gripping element 129 affixed to the lower end thereof. It will be noted, that each jaw has an exterior surface 130, which is of complemnetary shape to the tapered camming surface 124 of the chuck housing 122. Thus, when the jaws are pulled into the chuck housing 122, the jaws are progressively cammed to the closed position.

The lower end portion of the chuck housing 122 is inwardly offset to define an inwardly projecting camming ledge 131. Each jaw 127 has a camming pin affixed thereto intermediate the ends thereof and projecting outwardly therefrom. The camming ledge 131 is engaged by the camming pin 132 to cause the jaws to swing to the opened position, as best seen in FIG. 8, from the closed position, as best seen in FIG. 7. It will be noted, that the chuck housing 122 also has four notches 133 therein to permit outward swinging movement of the jaws 127 to a completely opened condition.

Means are also provided for resisting shifting movement of the jaws from the closed to the opened position and to this end it will be seen that a coil spring 134 is positioned around the shaft 114 and engages a collar 135 secured to the shaft and spaced upwardly above the chuck housing 122. The lower end of the spring 134 engages a bushing 136 positioned within a recess in the chuck housing 122 to normally urge the jaws to the closed condition.

Means are also provided for feeding chunks of meat to the deboning unit and for removing extracted bones therefrom, which cooperates with the spindle assembly and with conveyor means to be described hereinbelow, so that a continuous operation is possible. To this end, it will be seen that the web plate 75 of the mounting structure 73 has a laterally projecting mounting plate 137 fixedly secured to the central portion thereof and projecting laterally therefrom. The lower surface of the plate 137 has a drive device 138, which provides an index drive to an elongate shaft 139. It will be noted, that the upper end of the shaft 139 is positioned within an elongate sleeve or coupling 140, which has an outturned annular flange 141 integrally formed with its upper end. The flange 141 is suitably apertured and bolt and spacer assemblies 142 secure the same to the revolvable plate or rotary turntable 143 of the index drive device 138. This index drive device 138 is a rotary feed table made by the Bellows-Valvair Company and provided with a lubri-air control unit and 110-volt primary transformer.

The shaft 139, which is of elongate tubular construction has diametrically opposed longitudinally extending slots therein and the lower end of the shaft is positioned in abutting relation against the upper end of a vertically oriented lower tubular shaft 144. A tubular coupling member or sleeve 145 is pressed into telescoping relation within the adjacent ends of the lower shaft 144 and the upper shaft 139 to couple the same together. An L-shaped support frame member 146 is rigidly secured to one of the vertical frame elements 13 and the lower horizontal side frame element 15 of the frame structure 12. A bearing mount 147 is mounted on the frame element 146 and provides a mounting for a generally rod-shaped bearing 148, that revolvably supports the lower end of shaft 144. Thus, it will be seen, that when the turntable 143 is rotated in an indexed fashion, this rotary motion is transmitted to the shaft 139 and 144 as a unit.

An elongate infeed transfer arm 149 of generally tubular configuration, is provided at its innermost end with a mounting sleeve 150, which is positioned around the lower tubular shaft 144 and is secured thereto for rotation therewith by suitable bolts or the like. The outer end of the transfer arm 149 has a fitting support member 151 integrally formed therewith and provided with a U-shaped recess 152 therein to accommodate the grooves of a bone pinning fitting, which is applied to the bone of the ham to be deboned.

An elongate bone removal transfer arm 153 is provided with an elongate mounting sleeve 154 at one end thereof, and this mounting sleeve is disposed concentrically around the shaft 139. The mounting sleeve 154 has a pin 155 extending therethrough, and this pin also extends through the slots in the shaft 139, so that the sleeve and transfer arm 153, while being revolvable with the shaft 139 is also vertically translatable relative to the shaft 139. The outer end of the transfer arm 153 has a fitting support member 157 integrally formed therewith and provided with a U-shaped recess in the manner of the fitting support member 151. This fitting support member is also adapted to engage and support the bone pin fitting during removal of the bone from the deboning unit.

Figure 3:
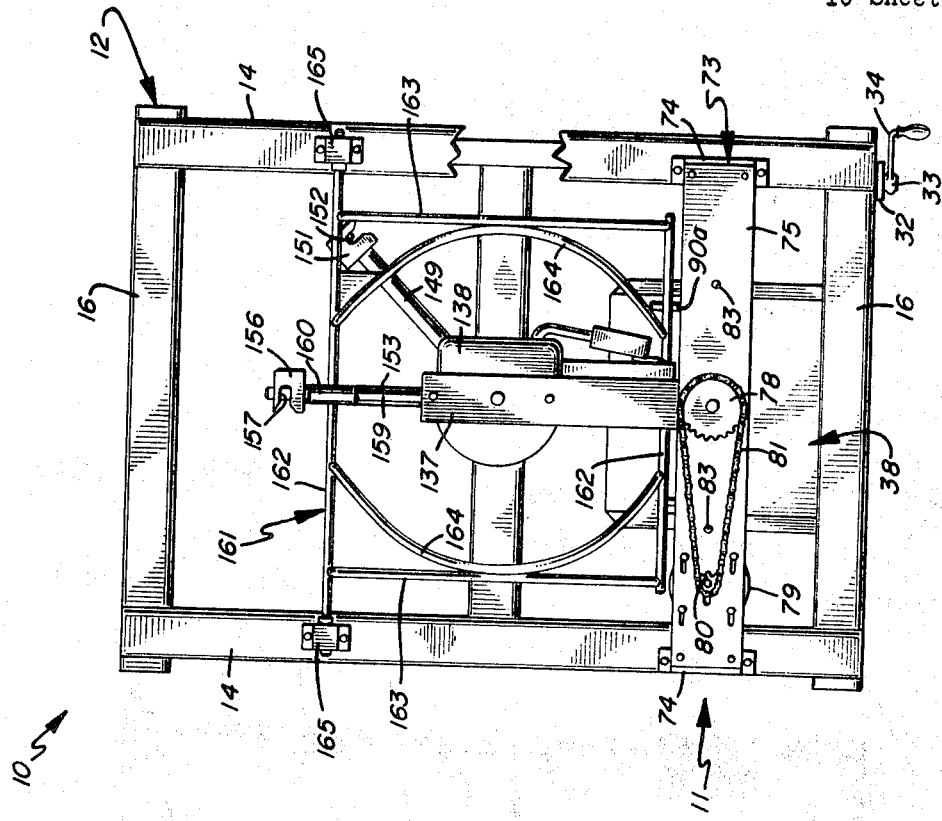
FIG. 3 is a top plan thereof.

A mounting sleeve 158 is positioned concentrically upon the mounting sleeve 154 and is secured thereto for rotation therewith by suitable bolt means. This mounting sleeve 158 has a cam follower arm 159 integrally formed therewith and projecting outwardly therefrom. The outer end of the arm 159 revolvably supports a cam follower or roller 160, which is preferably formed of oil bearing bronze. This cam follower or roller 160 is adapted to move along a cam track, which is mounted on the frame structure 12 as best seen in FIGS. 2 and 3. This cam track 161 includes a pair of elongate substantially straight end track elements 162, which are disposed in spaced apart parallel relation and a pair of side track elements 163, each being rigidly affixed to the end track elements 162. A pair of elongate arcuate track elements 164 have their respective ends connected to the end track elements 162 and have their median portion disposed in tangential relation to the side track elements 163. It will be noted that one of the end track elements 162 is of greater length than the other end track element and has its ends journalled in suitable bearings carried by post 165, which are secured to the upper horizontal side frame elements 14 of the frame structure 12. With this arrangement, the cam track 161 may pivot about an axis defined by the longer of the end track elements 162.

It will be noted that each of the rods 90 has a laterally projecting finger 90a integrally formed therewith and projecting outwardly therefrom adjacent the finger 91. This arrangement allows the bone to be transferred after extraction from the meat without requiring the spindle assembly to travel to a predetermined vertical position. These fingers 90a support the shorter of the end track elements 162 and serve to raise and lower the cam track during vertical shifting movement of the spindle assembly. It will be seen, that raising of the cam track by the fingers 90a causes pivoting movement of the cam track about the axis defined by the longer of the end track elements 162.

Inasmuch as the cam follower or roller 160 is engaged by the cam track, the arm 159 will be moved vertically upwardly to shift the arm 153 in a vertical direction relative to the shaft 139. It will be noted, that the lower tubular shaft 144 has a meat removing arm 166 integrally formed therewith for movement with the shaft. This arm 166 is adapted to engage and remove meat which has bene deboned, from supported relation upon the platform 167 secured to the frame elements 146.

Suitable conveyor means are also provided for conveying hams to be deboned to the deboning units, receiving extracted bones from the deboning unit and conveying the same away, and conveying deboned chunks of meat to a collection station. Referring now to FIGS. 1 and 11, it will be seen that a pair of upper conveyor mounting plates 168 are secured to a pair of the vertical frame elements 13 of the frame structure 12 adjacent the upper portion of the frame structure. Although in the embodiment shown, the plates 168 are mounted on a single deboning unit, it is pointed out that when a plurality of deboning units are arranged in alignment, one of the plates will be mounted on the deboning unit at one end of the group of aligned units and the other plate will be mounted on the deboning unit at the other end of the line of units. Each plate has a pair of horizontally oriented sprockets 169 revolvably journalled thereon by suitable axles 170. One of the sprockets will be driven by suitable power means, such as an electric motor to thereby drive an endless conveyor chain 171. It will be noted, that the endless conveyor chain has a plurality of fitting support members 172 secured thereto, each having a recess 173 therein, and each corresponding in shape and configuration to the fitting support member on the bone removal arm 153. It will be noted, that the endless chain conveyor 171 is horizontally oriented and that the innermost run of the chain conveyor extends interiorly of the mounting frame structure and in a position so that the bone pin fitting, which is supported in the fitting support member 156 of the bone removal transfer arm, will be engaged by one of the fitting support members on the chain conveyor 171 during swinging movement of the transfer arm 153. The outermost run of the endless chain conveyor 171 is positioned exteriorly of the frame structure, so that extracted bones supported by the fitting support members of this endless chain conveyor, will be moved to a discharge or collection station.

A pair of intermediate conveyor mounting plates 174 are also provided, and in the embodiment shown are mounted on vertical frame elements 13 of the frame structure 12. Each plate also has a pair of horizontally oriented sprockets 175 revolvably mounted thereon about which is trained an endless conveyor chain 176. This endless chain conveyor 176 is also provided with a plurality of fitting support members 177, each having a recess 178 therein and being constructed in the manner of the fitting support members 151. Suitable drive means are provided for driving one of the sprockets 175 and a chain conveyor is positioned below the upper chain conveyor and at an elevation slightly lower than the lower surface of the barrier or iris assembly. This chain conveyor is adapted to convey hams to be deboned from a loading station to the deboning units, so that these hams may be removed by the infeed transfer arm 149.

Means are also provided for removing the deboned chunks of meat to a collection point or station, and to this end, it will be seen that an elongate trough shaped structure 179 is provided and is mounted on the frame structure 12 below the upper and intermediate chain conveyors. This trough structure 179 comprises a pair of inclined trough members 180, as best seen in FIG. 2, each having an upturned flange along one longitudinal edge thereof for attachment to the frame structure 12 and each having a downturned longitudinal flange along its other longitudinal edge. The trough members 180 are spaced from each other to define an elongate opening 181, which extends throughout the length of the trough structure and through which water may drain.

Referring again to FIGS. 1 and 2, it will be seen that an elongate track structure 182 is provided, and presents outwardly opening longitudinally extending track channels 183 positioned adjacent the trough structure 179. An elongate endless chain conveyor 184 is trained about sprockets 185, only one of which is shown, affixed to a shaft 186 which is mounted by suitable bearings 187 on the frame element 146. Certain of the chain links of the endless chain conveyor 184 is provided with mounting blocks 188, each having an elongate pusher rod 189 affixed thereto and projecting laterally outwardly therefrom. The pusher rods along the outer run of the endless chain conveyor 184 move above but in close proximity to the upper surface of the trough structure 182 and engage deboned chunks of meat and urge the same along the trough to a collection point. These pusher rods also maintain the opening 181 in an open condition to assure proper drainage.

The means for driving the endless chain conveyor 184 comprises a sprocket 190 affixed to the lower end of the vertically oriented shaft 186, which has an endless drive chain 191 trained therearound. This drive chain 191 is also trained about a sprocket 192, which is revolvably supported on the lower end of an elongate vertically oriented shaft 193 having its lower end journalled in suitable bearings carried by a mounting bracket attached to the frame structure 12. The shaft 193 passes through suitable bearings 194 in the adjacent intermediate and upper conveyor mounting plates and is revolvably driven by a suitable electric motor 195 mounted adjacent the upper end of the frame structure 12.

During the operation of the apparatus, the upper, intermediate and lower conveyors will be simultaneously operated and it is pointed out that the upper and intermediate conveyors will be driven from a single power source. It will be noted that the fitting support members 172 on the inner run of the upper chain conveyor 171 have their recesses facing rearwardly while the fitting support members 177 on the inner run of the endless chain conveyor 176 have their recesses facing forwardly or in the direction of travel thereof. The fitting support member 156 on the bone removal transfer arm 153 has its recess facing forwardly or in the direction of travel of the bone removal transfer arm. The fitting support member 151 on the infeed transfer arm 149, however, has its recess facing rearwardly or away from the direction of travel or rotation of the infeed transfer arm. Thus, it will be seen that the fitting support members on the bone removal and infeed arms have their recesses disposed in opposite directions from each other and from the recesses in the associated chain conveyors.

Figure 15A:
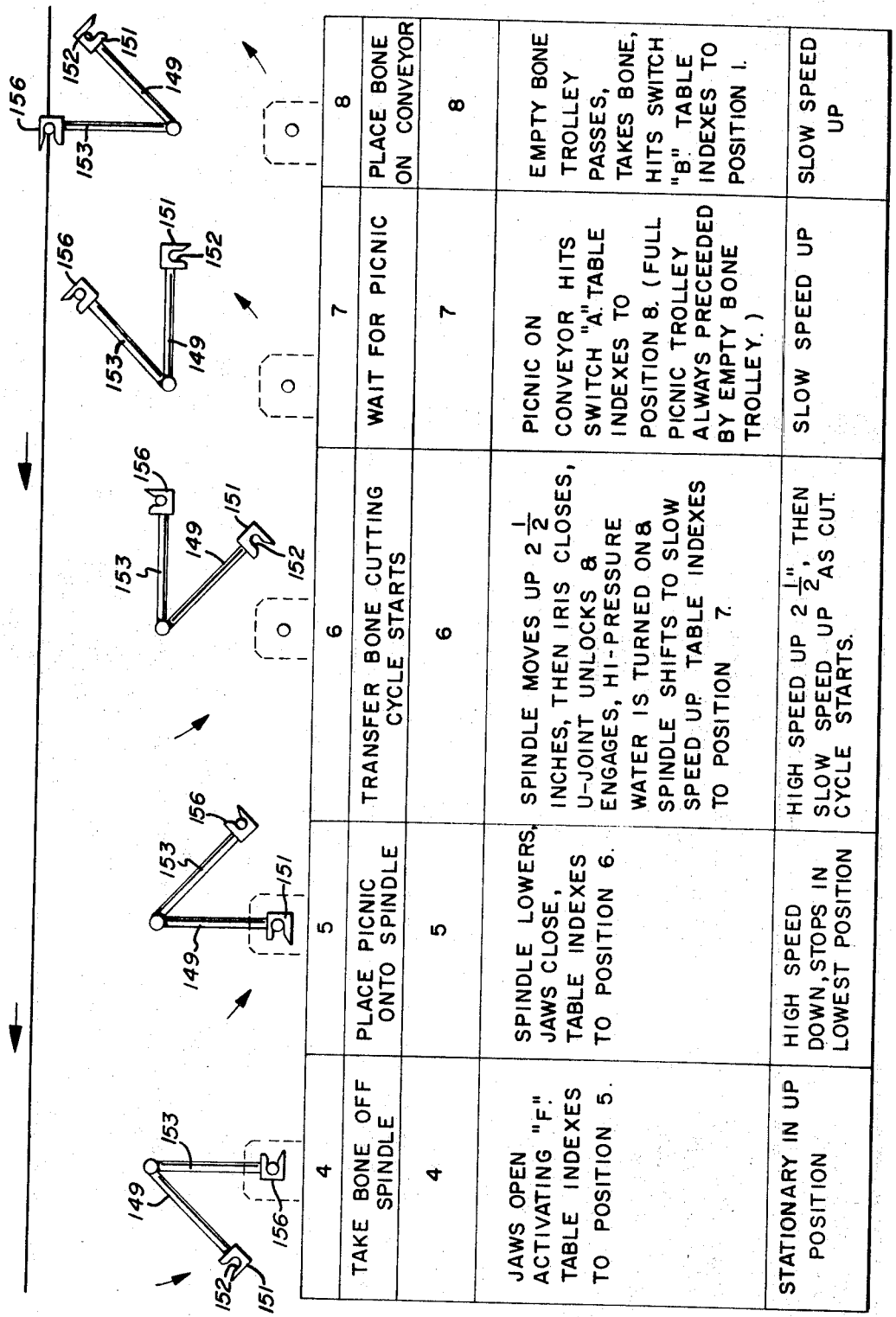

Referring now to FIGS. 15 and 15a, it will be seen that the bone removal arm and infeed transfer arm are illustrated in a plurality of indexed positions as these arms are moved through a complete cycle. It will be noted that these arms are also angularly disposed at an angle of approximately 45° relative to each other and are simultaneously revolved by the indexing drive device. To this end, it is pointed out that these arms are moved approximately through an arc of 45° during each increment of indexing rotary movement. Since the arms move through an arc of 360° during one cycle of operation, FIGS. 15 and 15a illustrate the eight different positions the arms assume after they have been moved through each 45° increment of movement.

Although not shown in the drawing, suitable circuit means will be provided for controlling operation of the index drive device 138. It will be noted that chain conveyors 171 and 176 are moving in the same direction as indicated by the arrows in FIG. 1. Referring again to FIGS. 15 and 15a, it will be seen that in position (1), the infeed transfer arm 149 is in a position to receive a ham to be deboned from the chain conveyor 176, while the bone removal arm 153 is in an unloaded condition but is disposed 45° forwardly of the infeed transfer arm. It is pointed out that each chunk of meat or ham to be deboned will have a bone pin fitting secured to the bone to be removed and this fitting, as shown, has suitable grooves therein, which are engaged by the fitting support members of the infeed transfer arm, the bone removal transfer arm and the fitting support members on the respective conveyors. When the arms are in position (1), the spindle assembly 72 will be revolving and moving upwardly at a slow speed. To this end, it is pointed out that the drive means for the spindle assembly is capable of operating at high and low speeds.

When a ham to be deboned is transferred to the infeed transfer arm, this action closes a switch so that the turntable 143 of the index drive device 138 is revolved through an arc of 45° to position (2). The spindle assembly 72 will continue upwardly at a relatively slow speed, as the arms are moved from position (1) to position (2). Thereafter, the arms are shifted from position (2) to position (3) by the index drive device 138. During movement of the infeed transfer arm and bone removal arm from positions (1) through (3), the spindle assembly, as pointed out above, will be moving upwardly and will be revolved at a relatively slow speed. During this movement, the jaws 127 of the spindle assembly will be in gripping relation with respect to a fitting secured to the bone of a ham being deboned. Thus, upward movement of the spindle assembly is during the bone removing operation and the nozzle mechanisms 61 will be discharging high velocity jets of water against the periphery of the bone.

When the arms are shifted to the number (3) position of the cycle, a switch is opened which, after the deboning operation, causes the operation of a solenoid valve for controlling pneumatic cylinders 52. It is pointed out that when the deboned chunk of meat falls, the switch is opened, which causes operation of the solenoid valve, and operation of pneumatic cylinders 52. The piston rods 53 associated with these pneumatic cylinders are retracted causing swinging movement of the barrier segments 43 and subsequent enlargement of the opening 51. Simultaneously during this action, a solenoid valve supplying water under pressure to the nozzle mechanisms 61 is closed to shut off discharge of water from these nozzle mechanisms. The spindle assembly 72 is then operated at high speed to move up rapidly until a switch is closed, which indexes the turntable 143 to position (4). The drive to the spindle assembly is interrupted so that as the infeed transfer and bone removal arm reach position (4), the spindle will be in an upper position and will be in a stationary condition. It is pointed out that this upper position of the spindle is not ordinarily the upper limit the spindle may travel. It is merely that position the spindle assembly reaches to permit clearance for removal of the bone. Prior to the spindle assembly reaching an upper position, an electric switch is closed, which operates a relay, which allows upward travel of the spindle assembly at a high speed just prior to the interruption of power thereto. As the spindle assembly reaches an upper position, a solenoid controlling operation of the valve to the pneumatic cylinders 94, will be actuated to retract the piston rods 96 so that the external tube 106 will be shifted upwardly relative to the drive tube assembly. The friction brake 104 will be engaged by the plate 98 to prevent revolving movement of the latter. Vertical movement of the external tube 106 causes the jaws 127 to be moved from the closed position to the opened condition, thereby releasing the bone pin fitting, which is secured to the extracted bone.

As the fitting attached to the extracted bone is released from the jaws, the fitting support member on the bone removal arm will engage the fitting to support the extracted bone. It is pointed out that the bone removal arm when in position (4) will also be at the proper elevation for receiving the disengaged fitting from the spindle assembly. The fingers 90a on the rods 90 will be elevated therewith to cause elevation of the declined side of the cam track 161.

The cam follower arm 159 is movable as a unit with the bone removal transfer arm 153 and these two arms are disposed in the same general vertical plane with each other as they are revolved. Therefore, when the bone removal transfer arm 153 is in position (4) the cam follower arm 159 will be in a corresponding position. Since the spindle assembly 72 is in a raised position, the fingers 90a will engage the cam track and raise the same thereby raising the cam follower arm and bone removal transfer arm. The fitting attached to the extracted bone is engaged by the bone removal arm and as the jaws 127 open an electric switch is closed, thus indexing the turntable 143 to position (5). As the infeed transfer arm and bone removal arm are moved from position (4) to position (5), the spindle assembly 72 will be revolved and moved downwardly at a relatively high speed, until a limit switch is engaged to stop the spindle assembly at its lowest position. As the spindle assembly reaches its lowermost position, the jaws 127 are closed to grip the bone pin fitting and the turntable is then indexed from position (5) to position (6).

As the turntable is moved from position (5) to position (6), the spindle assembly 72 will be revolved and will be moved upwardly 2½ inches, at which time, the solenoid valve controlling the air under pressure to the cylinders 52 will be operated to extend piston rods 53 and to reduce the size of the opening 51 through the barrier assembly. The solenoid valve controlling water under pressure to the main supply conduit 58 will be opened, so that water under pressure is discharged through the nozzle mechanism 61 and the spindle assembly 72 is revolved and moved upwardly at a relatively slow speed, so that the bone removing operation is begun with respect to the chunk of meat supported by the spindle assembly. During movement of the spindle assembly through the barrier assembly, which is a distance of approximately 2½ inches, the spindle assembly is operated at high speed but during the actual bone removal operation, the spindle assembly is moved at a slow speed. The turntable is then indexed to position (7).

As the turntable is indexed to position (7), a ham, which is supported on the intermediate chain conveyor, which approaches the deboning unit, will engage a switch to close the same thereby causing the turntable to shift to position (8). During this movement of the turntable, the spindle assembly is moving upwardly at a relatively slow speed and the high pressure jets of water will strike the surface of the bone as it is pulled through the iris assembly to very effectively separate the bone from the chunk of meat. As the chunk of meat is separated from the embedded bone, the chunk of meat will engage the lower surface of the barrier assembly to effect a peeling action and to minimize any tendency of the high pressure jets of water to shred or tear the chunk of meat. By revolving the spindle assembly during the bone removal operation, the periphery of the bone being removed is continuously exposed to the high velocity jets of water.

As the turntable is indexed to position (8), the bone removal arm 153 will be positioned so that a fitting support member on the upper endless chain conveyor will engage the fitting supporting the extracted bone and will remove the same from the bone removal arm. As this occurs, an electric switch is closed by engagement of the switch by the bone transferred to the chain conveyor and the turntable is then indexed to position (1), thus completing the cycle.

As pointed out above, the spindle assembly continues upwardly at its slow speed from position (1) to position (3), at which time the bone removal operation takes place. The chunk of meat from which the bone has been removed will fall upon a platform 167 supported upon the frame elements 146 and each chunk of meat will be engaged by the meat removing arm 166 as the latter is revolved. This meat removing arm 166 will move the deboned chunk of meat from the platform 167 to the trough structure 179. The endless chain conveyor 184, which is moving in the channels of the track structure 182 will move the chunks of meat along the trough structure by means of the pusher rods 189. The deboned chunks of meat will be moved to a collection station where they will be collected. Similarly, the extracted bones will also be moved to a collection station by the chain conveyor 171 where the bones will be collected and the bone pin fittings removed therefrom.

The use of an indexing infeed means for feeding chunks of meat to be deboned into the deboning unit, and for removing the extracted bones therefrom, cooperate with the conveyor means to permit the deboning operation to be continuously carried out. By incorporating the nozzle mechanisms into the barrier assembly, very efficient use of the high velocity jets of water is obtained. To this end, it is pointed out that the configurations of the bones to be removed, while being generally somewhat similar, also vary, not only in size but specifically in cross-sectional shape. The iris or barrier segments of the barrier assembly normally engage the bone as it is pulled therethrough, and by incorporating the nozzle mechanisms in the barrier segments, accurate positioning of the nozzle mechanisms is maintained, even though the bone may vary in cross-sectional shape and size. A releasable gripping means on the lower end of the spindle assembly permits the bone pin fitting to be releasably gripped thereby, in such a manner that the bone pin fitting is very firmly gripped but is automatically released to permit ready transfer of the extracted bone to the bone removal arm.

From the foregoing description it will be seen that we have provided a novel process and apparatus, which is capable of removing a core member of an article from embedded relation within a second material of an article. The core member of such an article will have a different density or hardness than the second surrounding material, so that the core material and the second material may be effectively separated by high velocity jets of water while maintaining the core material and second material in an intact condition. This particular process and apparatus is especially adaptable for use in removing bone from embedded relation within a chunk of meat without impairing the integrity of the bone and chunk of meat.

Thus, it will be seen that we have provided a novel process and apparatus for removing a core member, such as a bone, from embedded relation, within a second material, such as a chunk of meat, which apparatus and process functions in a more efficient manner than any heretofore known comparable process and apparatus.

It will, of course, be understood that various changes may be made in the form, details, arrangement and proportions of the various parts without departing from the scope of our invention.

What is claimed is:

1. An apparatus system for removing an embedded bone from embedded relation within a chunk of meat, said apparatus comprising a barrier assembly having an opening therein, means engaging the chunk of meat and applying force thereto to progressively cause the embedded bone to be moved through the opening in the barrier assembly, jet means discharging a plurality of high velocity jets of flowable material against the periphery of the bone as it is moved through the opening in the barrier assembly to cause progressive separation of the bone and chunk of meat from each other, while maintaining the chunk of meat and extracted bone respectively in substantially intact condition and retaining the deboned chunk of meat against the barrier assembly, and shiftable infeed transfer mechanism disposed in proximal relation to said engaging means and adapted to support a chunk of meat and embedded bone, and being shiftable from a receiving position to a transfer position for transferring the same to said article engaging means, a shiftable removal transfer mechanism disposed in proximal relation to said engaging means and being shiftable from a receiving position to receive and support an extracted bone from said engaging means, and being shiftable to a transfer position, spaced apart first and second endless conveyors each having a plurality of support members thereon, said first conveyor being disposed in proximal relation to said infeed transfer mechanism to permit chunks of meat supported by the associated support members to be transferred to said infeed transfer mechanism, said second conveyor mechanism being disposed in proximal relation to said removal transfer mechanism to permit the associated support members to receive and support extracted bones transferred from said removal transfer mechanism.

2. The apparatus as defined in claim 1 wherein said infeed transfer mechanism and said removal transfer mechanism are simultaneously shiftable as a unit in a first direction and are shiftable relative to each other in a second direction.

3. The apparatus as defined in claim 1 wherein said infeed transfer mechanism includes an elongate arm having means thereon for supporting a chunk of meat to be deboned, said bone removal mechanism including an elongate arm having means thereon for engagement with and support of a bone extracted from a chunk of meat, said arms being revolvable as a unit through an arc of approximately 360° during one cycle of operation.

4. The apparatus as defined in claim 3 and drive means for revolving said arms through a plurality of indexed positions in one cycle of operation.

5. The apparatus as defined in claim 1 wherein said infeed transfer and said removal transfer mechanisms each comprises an elongate arm shiftable between receiving and transfer positions.

6. The apparatus as defined in claim 1 wherein said first and second conveyors are horizontally oriented and are vertically spaced apart.

7. An apparatus for removing a bone from embedded relation within a chunk of meat, said apparatus comprising a barrier assembly having an opening therein, an elongate revolvable spindle assembly being revolvable and longitudinally movable relative to the barrier assembly, means on said barrier assembly for engagement with a chunk of meat whereby upon longitudinal shifting movement of the spindle assembly, the bone embedded in the chunk of meat will be progressively forced through the opening in the barrier, a plurality of jet mechanism mounted on said barrier segments adjacent the inner marginal portions thereof, discharging a plurality of high velocity jets of flowable material against the periphery of the bone as it is moved through the opening in the barrier assembly to cause separation of the bone from the chunk of meat while maintaining the chunk of meat and bone respectively in substantially intact condition, and retaining the deboned chunk of meat against the barrier assembly, conveyor means for conveying unboned chunks of meat into proximal relation to the spindle assembly, and for supporting and removing extracted bones, an infeed transfer mechanism engaging the unboned chunks of meat supported by said conveyor means and transferring each unboned chunk of meat to said spindle assembly, and a removal transfer mechanism receiving the extracted bones from the spindle assembly and transferring the same to said conveyor means.

8. The apparatus as defined in claim 7 and coacting means on said removal transfer mechanism and said spindle assembly to cause longitudinal movement of said removal transfer mechanism to said receiving position during longitudinal movement of said spindle assembly.

9. The apparatus as defined in claim 8 wherein said coacting means comprises coacting cams.

References Cited

UNITED STATES PATENTS 3,402,423  9/1968  Helgeson et al. _____ 17—1

FOREIGN PATENTS 561,246  10/1932  Germany.

LUCIE H. LAUDENSLAGER, Primary Examiner

U.S. Cl. X.R.

17—46